(12) United States Patent
Hampson et al.

(10) Patent No.: US 9,940,679 B2
(45) Date of Patent: Apr. 10, 2018

(54) SYSTEMS, METHODS, AND COMPUTER-READABLE MEDIA FOR EVENT CREATION AND NOTIFICATION

(71) Applicant: Google Inc., Mountain View, CA (US)

(72) Inventors: Courtney Lynn Hampson, Mountain View, CA (US); Jason Robert Richard Sanio, Mountain View, CA (US)

(73) Assignee: Google LLC, Mountain View, CA (US)

( * ) Notice: Subject to any disclaimer, the term of this patent is extended or adjusted under 35 U.S.C. 154(b) by 332 days.

(21) Appl. No.: 14/181,599

(22) Filed: Feb. 14, 2014

(65) Prior Publication Data

US 2015/0234570 A1    Aug. 20, 2015

(51) Int. Cl.
G06Q 10/10    (2012.01)
G06Q 50/00    (2012.01)

(52) U.S. Cl.
CPC ........... *G06Q 50/01* (2013.01); *G06Q 10/109* (2013.01)

(58) Field of Classification Search
CPC .. G06Q 10/1093; G06Q 10/02; H04L 65/403; G06F 17/28; H04N 21/45
USPC ............................ 705/7.18, 5; 715/753, 738
See application file for complete search history.

(56) References Cited

U.S. PATENT DOCUMENTS

| | | | |
|---|---|---|---|
| 8,260,728 B1 * | 9/2012 | Walsh | A63F 13/12 706/12 |
| 9,082,111 B2 * | 7/2015 | Cronin | G06Q 10/109 |
| 2001/0014867 A1 * | 8/2001 | Conmy | G06F 17/211 705/7.18 |
| 2003/0005056 A1 * | 1/2003 | Yamamoto | G06Q 10/109 709/205 |
| 2003/0115189 A1 * | 6/2003 | Srinivasa | G06F 17/30699 |
| 2008/0033778 A1 * | 2/2008 | Boss | G06Q 10/109 705/7.18 |
| 2008/0092059 A1 * | 4/2008 | White | G06Q 10/06 715/747 |
| 2008/0109475 A1 * | 5/2008 | Burmester | G06F 17/2785 |
| 2009/0106698 A1 * | 4/2009 | Hansen | G06F 17/30905 715/838 |
| 2010/0131443 A1 * | 5/2010 | Agarwal | G06F 17/30867 706/46 |
| 2011/0184768 A1 * | 7/2011 | Norton | G06Q 10/02 705/5 |
| 2012/0136689 A1 * | 5/2012 | Ickman | H04W 4/206 705/7.19 |
| 2013/0104170 A1 * | 4/2013 | Su | H04N 21/4332 725/40 |

(Continued)

*Primary Examiner* — Jennifer To
*Assistant Examiner* — Jasmine Wan
(74) *Attorney, Agent, or Firm* — Dority & Manning, P.A.

(57) ABSTRACT

Systems, methods, and computer-readable media are provided for verifying parameters for a user-created event. In accordance with one implementation, a computer-implemented method is provided that comprises receiving a set of parameters for an event created by a user. Further, the method includes verifying the set of parameters for the event by comparing the set of parameters to source data and determining, based on a result of the verification, replacement data for one or more of the set of parameters for the event. The method also includes presenting, on a display device, the replacement data for selection by the user and updating, based on a selection received from the user, the set of parameters for the event to include the replacement data.

33 Claims, 9 Drawing Sheets

(56) References Cited

U.S. PATENT DOCUMENTS

| | | | |
|---|---|---|---|
| 2013/0158984 A1* | 6/2013 | Myslinski | G06F 17/28 704/9 |
| 2013/0298043 A1* | 11/2013 | Bailey | H04L 65/403 715/753 |
| 2013/0332839 A1* | 12/2013 | Frazier | H04N 21/4532 715/738 |
| 2014/0025421 A1* | 1/2014 | Sen | G06Q 10/06 705/7.23 |
| 2014/0059608 A1* | 2/2014 | Beattie, Jr. | H04N 21/45 725/39 |
| 2014/0372904 A1* | 12/2014 | Liu | G06F 3/01 715/753 |
| 2015/0095086 A1* | 4/2015 | Gopinath | G06Q 10/1093 705/7.18 |
| 2015/0149452 A1* | 5/2015 | Warner | G06F 17/30554 707/725 |
| 2015/0199649 A1* | 7/2015 | Weinberg | G06Q 10/1093 705/7.19 |
| 2015/0234377 A1* | 8/2015 | Mizikovsky | G06F 17/5004 700/98 |

* cited by examiner

SYSTEMS, METHODS, AND COMPUTER-READABLE MEDIA FOR EVENT CREATION AND NOTIFICATION

TECHNICAL FIELD

The present disclosure relates generally to the field of data processing and computerized systems and methods for event creation and notification. More particularly, and without limitation, the present disclosure relates to systems, methods, and computer-readable media for verifying parameters for a user-created event.

BACKGROUND

It is often desirable to enable users of calendar applications or social networks to create individual or group events. A user may input a variety of parameters to establish or characterize an event. For example, a user may input the name of an event, the name of a location for the event, the address of the location, a start and end time of an event, the type of event, and/or users that are invited to the event. These parameters may be stored locally on a user's device or remotely at a server or database. Event creation can enable, for example, invitees to become aware of events, events to appear on the calendars of all attendees, users to be reminded of upcoming events, etc.

When creating an event, a user may not be aware of data that may affect the event or make the event, as characterized by the user-entered parameters, unachievable or undesirable. For example, the user may create an event at a coffee shop during a time period that is outside of normal business hours or when the coffee shop is unexpectedly closed. Moreover, new data regarding an event may become available after an event is created. For example, after the event is created, the coffee shop may change its business hours such that an event at the coffee shop falls outside of business hours. As an additional example, the coffee shop may be moved or change location.

Accordingly, and in view of the foregoing, there is a need for systems, methods, and computer-readable media that are capable of verifying parameters for a user-created event. There is also a need for computerized solutions that overcome the drawbacks and limitations of conventional systems and methods for event creation and notification.

SUMMARY

The present disclosure relates to embodiments for event creation and notification, and for verifying parameters for a user-created event. Moreover, embodiments of the present disclosure include systems, methods, and computer-readable media that are capable of verifying parameters for a user-created event. As will be appreciated, embodiments of the present disclosure may be implemented with any combination of hardware, software, and/or firmware, including computerized systems and methods embodied with processors or processing components.

In one embodiment consistent with the present disclosure, a computer-implemented system is provided for creating an event. The system includes a memory device that stores a set of instructions and at least one processor. The at least one processor executes the instructions to receive a set of parameters for an event created by a user, verify the set of parameters for the event by comparing the set of parameters to source data, and determine, based on a result of the verification, replacement data for one or more of the set of parameters for the event. The at least one processor also executes the instructions to present, on a display device, the replacement data for selection by the user, and update, based on a selection received from the user, the set of parameters for the event to include the replacement data.

In another embodiment consistent with the present disclosure, a method is provided for creating an event. The method includes receiving a set of parameters for an event created by a user. The method also includes verifying the set of parameters for the event by comparing the set of parameters to source data, and determining, based on a result of the verification, replacement data for one or more of the set of parameters for the event. The method also includes presenting, on a display device, the replacement data for selection by the use and updating, based on a selection received from the user, the set of parameters for the event to include the replacement data.

In still another embodiment consistent with the present disclosure, a non-transitory computer-readable medium storing instructions is provided. The instructions, when executed by at least one processor, cause the at least one processor to perform operations comprising receiving a set of parameters for an event created by a user, verifying the set of parameters for the event by comparing the set of parameters to source data, and determining, based on a result of the verification, replacement data for one or more of the set of parameters for the event. The instructions also cause the at least one processor to present, on a display device, the replacement data for selection by the user, and update, based on a selection received from the user, the set of parameters for the event to include the replacement data.

Additional aspects and embodiments consistent with the present disclosure will be set forth in part in the description which follows, and in part will be obvious from the description, or may be learned by practice of the invention, as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

Embodiments of the present disclosure include computer-implemented methods, tangible non-transitory computer-readable mediums, and computer-implemented systems. The computer-implemented methods may be executed, for example, by a processor that receives instructions from a non-transitory computer-readable storage medium. Similarly, systems consistent with the present disclosure may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
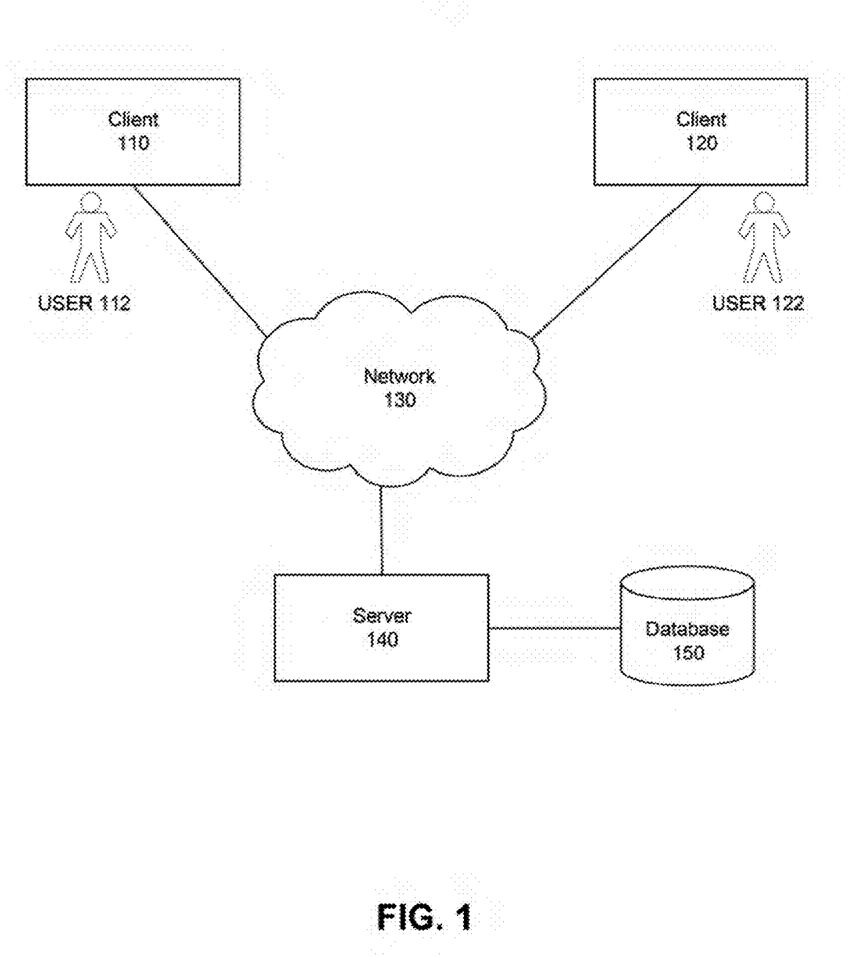
FIG. 1 illustrates an exemplary system environment for implementing embodiments and features of the present disclosure.

FIG. 1 is a block diagram of an exemplary system environment 100 for implementing embodiments and features of the present disclosure. The arrangement and number of components in system 100 is provided for purposes of illustration. Additional arrangements, number of components, and other modifications may be made, consistent with the present disclosure.

As shown in FIG. 1, system environment 100 may include one or more clients 110, 120 that are owned or operated by one or more users 112, 122. By way of example, clients 110, 120 may include smartphones, tablets, netbooks, electronic readers, personal digital assistants, personal computers, laptop computers, desktop computers, and/or other types of electronics or communication devices. In some embodiments, clients 110, 120 are implemented with hardware devices and/or software applications running thereon. In certain embodiments, client 110 or 120 may implement embodiments and features of the present disclosure without the need for accessing another device, component, or network, such as network 130. In other embodiments server 140 may implement embodiments and features of the present disclosure without the need for accessing another device, component, or network 130. In yet other embodiments, clients 110, 120 may be configured to communicate to and/or through network 130 with other clients and components, such as server 140 and database 150, and vice-versa.

In certain embodiments, network 130 may include any combination of communications networks. For example, network 130 may include the Internet and/or any type of wide area network, an intranet, a metropolitan area network, a local area network (LAN), a wireless network, a cellular communications network, etc. In some embodiments, clients 110, 120 may be configured to transmit requests (e.g., requests based on input provided by users 112, 122) or other data through network 130 to an appropriate server, such as, for example, server 140. For example, clients 110, 120 may be configured to transmit requests to create events, parameters characterizing events, and other event-related data to server 140. In some embodiments, clients 110, 120 may also be configured to receive information from server 140 through network 130. For example, clients 110, 120 may be configured to receive data (e.g., HTML data) characterizing a user interface for event creation from server 140. Moreover, as described in more detail below, clients 110, 120 may be configured, for example, to receive replacement data to replace user-entered parameters characterizing an event from server 140.

Server 140 may include one or more servers configured to communicate and interact with clients 110, 120 and database 150. In some embodiments, server 140 may implement or provide one or more search engines, event creation and notification services, and/or event creation and notification engines. Server 140 may be a general-purpose computer, a mainframe computer, or any combination of these components. In certain embodiments, server 140 may be stand-alone computing system or apparatus, or it may be part of a subsystem, which may be part of a larger system. For example, server 140 may represent distributed servers that are remotely located and communicate over a communications medium (e.g., network 130) or over a dedicated network, for example, a LAN. Server 140 may be implemented as a server, a server system comprising a plurality of servers, or a server farm comprising a load balancing system and a plurality of servers.

Database 150 may include one or more logically and/or physically separate databases configured to store data. The data stored in database 150 may be received from servers 140, from clients 110, 120 and/or may be provided as input using conventional methods (e.g., data entry, data transfer, data uploading, etc.). The data stored in the database 150 may take or represent various forms including, but not limited to, documents, presentations, textual content, mapping and geographic information, rating and review information, pricing information, days and hours of operation information, news, audio files, video files, parameters characterizing user-created events, and a variety of other electronic data, or any combination thereof.

In some embodiments, database 150 may be implemented using a single computer-readable storage medium. In other embodiments, database 150 may be maintained in a network attached storage device, in a storage area network, or combinations thereof, etc. Furthermore, database 150 may be maintained and queried using numerous types of database software and programming languages, for example, SQL, MySQL, IBM DB2®, Microsoft Access®, PERL, C/C++, Java®, etc. Although FIG. 1 shows database 150 associated with server 140, database 150 may be a standalone database that is accessible via network 130 or database 150 may be associated with or provided as part of a system or environment that may be accessible to clients 110, 120 and/or other components.

Figure 2:
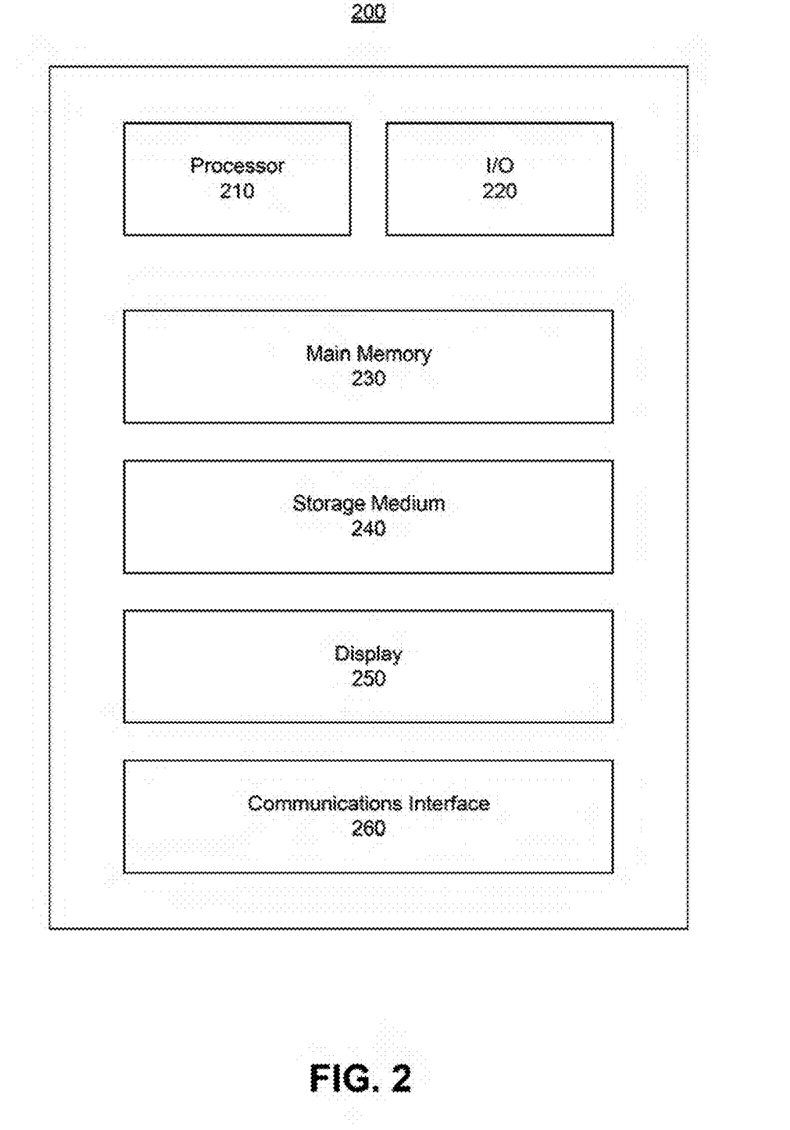
FIG. 2 illustrates an exemplary electronic apparatus or system for implementing embodiments and features of the present disclosure.

FIG. 2 is a block diagram of an exemplary electronic apparatus or system 200 for implementing embodiments and features of the present disclosure. By way of example, apparatus or system 200 may be used to implement clients 110, 120 and/or server 140 of FIG. 1. The arrangement and number of components in system 200 is provided for purposes of illustration. Additional arrangements, number of components, and other modifications may be made, consistent with the present disclosure.

As shown in FIG. 2, system 200 may include one or more processors 210 for executing instructions. Processors suitable for the execution of instructions include, by way of example, both general and special purpose microprocessors, and any one or more processors of any kind of digital computer. System 200 may also include one or more input/output (I/O) devices 220. By way of example, I/O devices 220 may include physical keyboards, virtual touch-screen keyboards, mice, joysticks, styluses, etc. In certain embodiments, system 200 may also be capable of receiving input through a microphone (not shown) using, for example, voice recognition applications.

As further illustrated in FIG. 2, system 200 may include one or more storage devices configured to store data and/or software instructions used by the one or more processors 210 to perform operations consistent with disclosed embodiments. For example, system 200 may include main memory 230 configured to store one or more software programs that performs functions or operations when executed by the one or more processors 210. By way of example, main memory 230 may include NOR or NAND flash memory devices, Read Only Memory (ROM) devices, Random Access Memory (RAM) devices, etc. System 200 may also include storage medium 240. By way of example, storage medium 240 may include hard drives, solid state drives, tape drives, RAID arrays, etc. Although FIG. 2 shows only one main memory 230 and one storage medium 240, system 200 may include any number of main memories 230 and storage mediums 240. Further, although FIG. 2 shows main memory 230 and storage medium 240 as part of system 200, main memory 230 and/or storage medium 240 may be located remotely and system 200 may be able to access main memory 230 and/or storage medium 240 via network 130.

System 200 may also include one or more displays 250 for displaying data and information. Display 250 may be implemented using devices or technology, such as a cathode ray tube (CRT) display, a liquid crystal display (LCD), a plasma display, a light emitting diode (LED) display, a touch screen type display, and/or any other type of display known in the art.

System 200 may also include one or more communications interfaces 260. Communications interface 260 may allow software and data to be transferred between system 200, network 130, clients 110, 120, and/or other components. Examples of communications interface 260 may include a modem, a network interface (e.g., an Ethernet card), a communications port, a PCMCIA slot and card, etc. Communications interface 260 may transfer software and data in the form of signals, which may be electronic, electromagnetic, optical, or other signals capable of being received by communications interface 260. These signals may be provided to communications interface 260 via a communications path (not shown), which may be implemented using wire, cable, fiber optics, radio frequency ("RF") link, and/or other communications channels.

The disclosed embodiments are not limited to separate programs or computers configured to perform dedicated tasks. For example, server 140 may include main memory 230 that stores a single program or multiple programs. Additionally, server 140 may execute one or more programs located remotely from server 140. In some exemplary embodiments, server 140 may be capable of accessing separate web server(s) or computing devices that generate, maintain, and provide web sites and/or event creation and notification services. Clients 110, 120 may function in a manner similar to server 140 and vice-versa.

Figure 3:
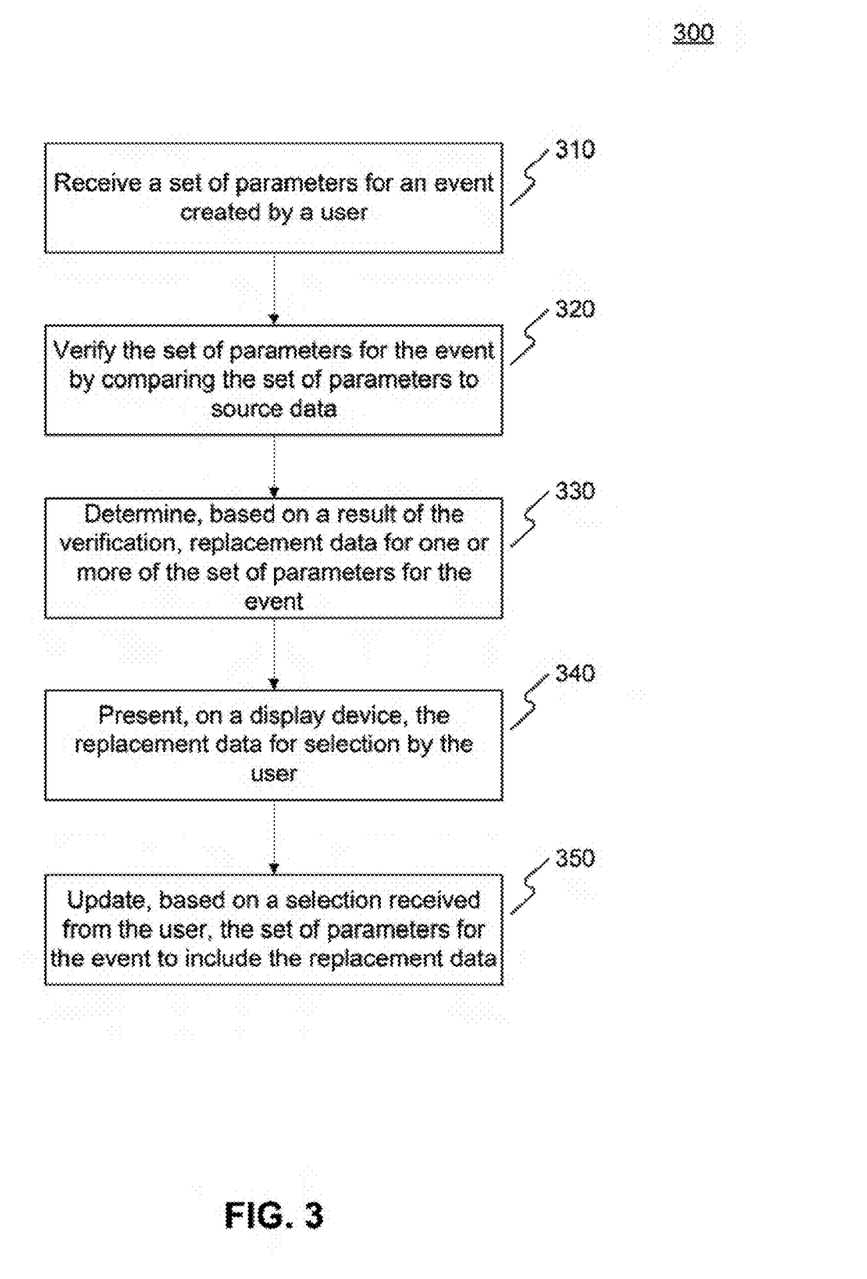
FIG. 3 illustrates an exemplary method for creating an event for a user.

FIG. 3 depicts a flowchart of an exemplary method 300, consistent with some embodiments of the present disclosure. Method 300 may be implemented for creating an event for a user. As used herein, a user-created event may include, for example, a calendar event, a social network event, and the like. In some embodiments method 300 may be implemented as one or more computer programs executed by a processor. Moreover, in some embodiments, method 300 may be implemented by a server (e.g., server 140 having one or more processors executing one or more computer programs stored on a non-transitory computer readable medium), a client (e.g., client 110, 120 having one or more processors executing one or more computer programs stored on a non-transitory computer readable medium), or by a combination of a client and a server.

In some embodiments, exemplary method 300 begins by receiving a set of parameters for an event created by a user (step 310). The set of parameters for the event may be entered by a user through a client 110, 120 and include, for example, one or more parameters including a start time (which may include, for example, a time of day and/or a date), a location (which may include, for example, a geographic location and/or a location name such as a business name), an end time, a duration, a title, recurrence frequency of the event, one or more invitees for the event (which may be described, for example, by a username, phone number, email address, or other identifier), privacy settings, a detailed description, and/or any other parameter that may be descriptive of an event.

Figure 6:
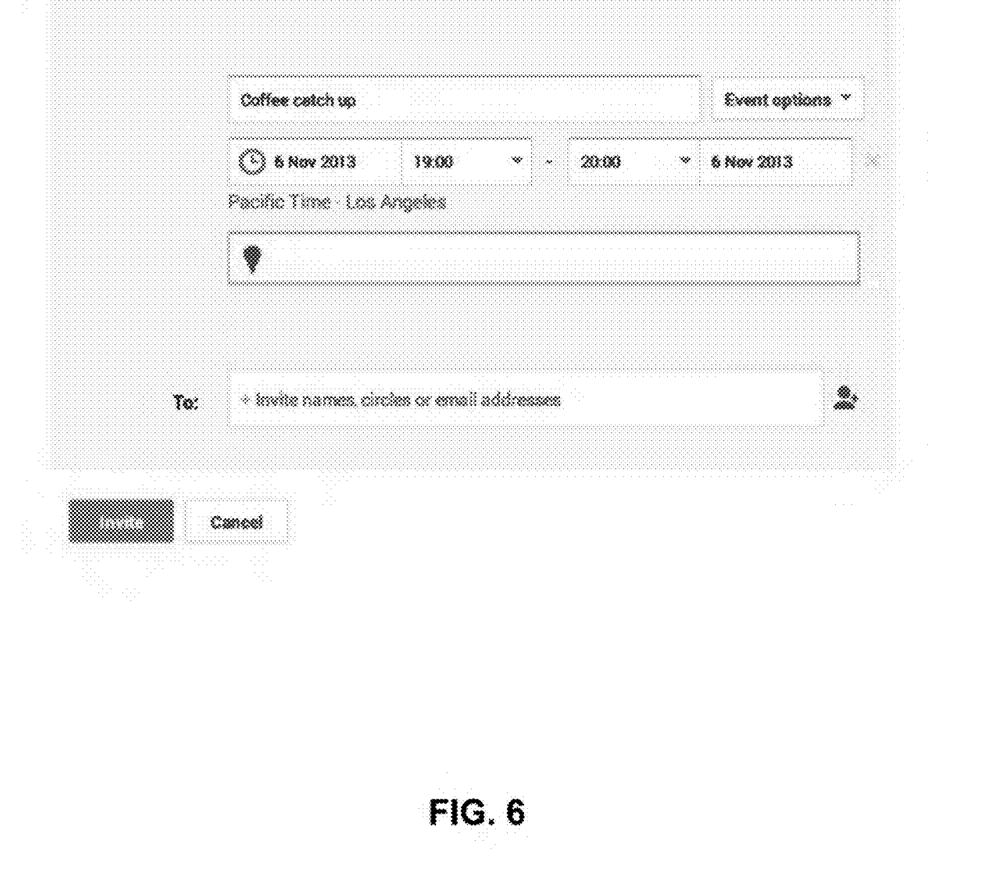
FIG. 6 illustrates an exemplary user interface for creating an event.

FIG. 6 depicts one example of a user interface that may be used for receiving the set of parameters and creating an event. For example, data, such as HTML data, may be sent from server 140 to a client 110, 120 to cause the client 110, 120 to display a user interface. Alternatively, for example, user interface software may be stored and run on a client 110, 120. In the example depicted in FIG. 6, a user has entered a set of parameters characterizing an event, including a title of "Coffee catch up," a start time of Nov. 6, 2013, at 19:00, and an end time of Nov. 6, 2013, at 20:00. In some embodiments, each time a parameter is entered at client 110, 120, it may be transmitted to server 140 via network 130. Alternatively, in some embodiments, sets of parameters (e.g., a predetermined number of parameters, upon entering particular parameters, or in response to a user selection of a button (e.g., "Invite" or "Create event")) may be transmitted from client 110, 120, to server 140 via network 130.

Figure 7:
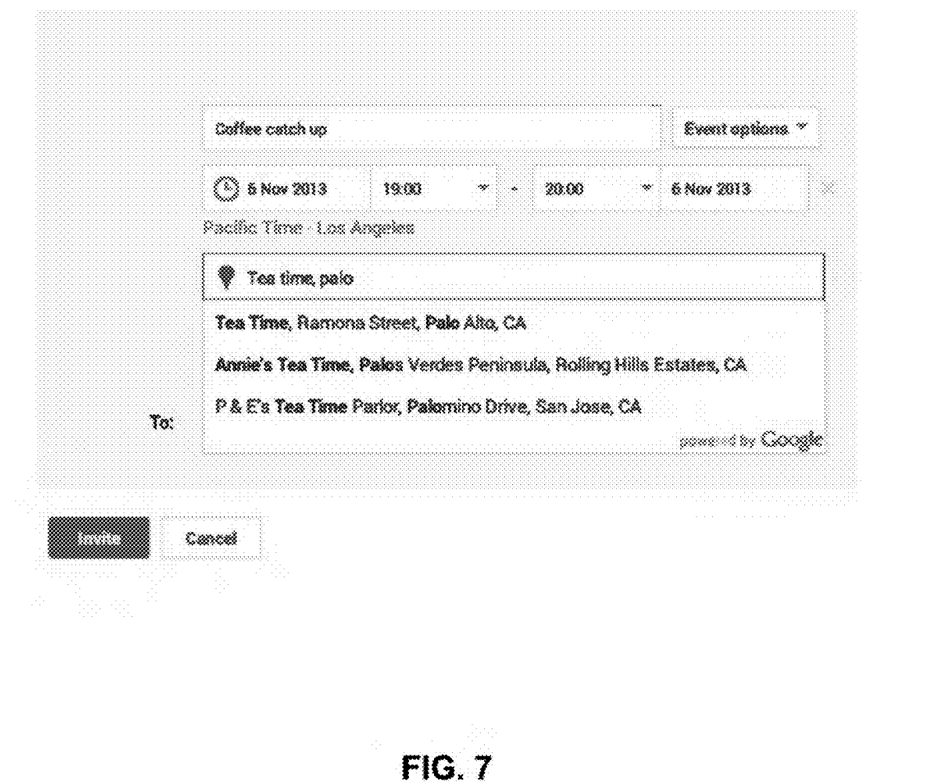
FIG. 7 illustrates an exemplary user interface for creating an event.

As depicted in a further illustration of the user interface in FIG. 7, the user may enter text indicative of a location, such as "Tea time, palo," intending to find a business named "Tea Time" in Palo Alto, Calif. A set of one or more proposed locations, as depicted in FIG. 7, may be displayed based on the user-entered text. The proposed locations may be stored and determined locally at a client 110, 120, or may be determined by server 140 and transmitted to the client 110, 120. The user may select, for example, "Tea Time, Ramona Street, Palo Alto, Calif."

Referring again to FIG. 3, method 300 may verify the set of received parameters for the event by comparing the set of parameters to source data (step 320). In some embodiments, the verification may be performed after each parameter is entered. Alternatively, the verification may be performed after particular parameters are entered (e.g., immediately after a location for an event is entered), after a particular set of parameters are entered (e.g., after a time and location for an event are entered), or after all of the parameters for an event have been entered (e.g., in response to a user selection of a button, such as "Invite" or "Create event"). In some embodiments, the verification may be performed before an event is created. In other embodiments, the verification may be performed after an event is created (e.g., a predetermined amount of time before an event begins, at repeating intervals of time, or in response to new data being available). In some embodiments, the verification may be performed once. In other embodiments, the verification may be performed more than once (e.g., before an event is created and after an event is created). The verification can also be performed periodically or at a predetermined time defined by the user or administrator.

The source data may include, for example, one or more of crawled-Internet data, comments from other users, parameters related to other events, data from social networks or media, and/or any other event-related data. Comparing the set of parameters to the source data may include, for example, determining whether any of the set of parameters conflicts with the source data. For example, the set of parameters may include a particular time and business location for an event, while the source data may include data that indicates that the business location is closed during the particular time. For example, the source data may include data indicative of a business's operating hours (captured, for example, by crawling a website associated with the business), and the particular time of the event may fall outside of the business's operating hours. Thus, for example, the comparison of the set of parameters to the source data may provide an indication that a time for an event is incompatible (e.g., falls outside of operating hours) with a business location. Other conflict determinations are also possible. For example, a user may attempt to invite a given number of people to an event, while the source data may indicate that the number of people invited to the event exceeds a location's maximum occupancy or maximum reservation size.

Source data may be generated or collected periodically and indexed for particular businesses and/or locations. Source data may also be generated dynamically by searching and gathering data in response to an occurrence that may affect location or business hours, such as, for example, inclement weather. For example, in response to a determination that a snow storm may affect a location, a web site associated with a business in the location may be crawled for source data.

Source data may be collected that is inconsistent with other source data. For example, one item of source data may indicate that a business has different operating hours than another item of source data. In some embodiments, source data may be processed to determine, for example, which source data is most likely to be correct. For example, crawled-Internet data may be assigned a greater weight than comments from other users and/or recent source data may be assigned a greater weight than old source data.

Method 300 may then determine, based on a result of the verification, replacement data for one or more of the set of parameters for the event (step 330). The replacement data may include, for example, an alternative time for the event, an alternative location for the event, and/or any other alternative parameter to replace or augment an existing one of the set of parameters. The determination of the replacement data may include, for example, an analysis of the set of parameters for the event. For example, as discussed in more detail below with reference to FIG. 4, the determination of the replacement data may include a determination of an alternative time based on an analysis of the set of parameters for the event. For example, an alternative time within a predetermine amount of a time within the set of parameters may be selected. In addition, as discussed in more detail below with reference to FIG. 4, the determination of the replacement data may also, or alternatively, include a determination of an alternative location based on the analysis of the set of parameters for the event.

Method 300 may then present, on a display device, the replacement data for selection by the user (step 340). Presenting replacement data, as used herein, may refer to both displaying the replacement data and/or transmitting the replacement data to a remote device. For example, server 140 may present the replacement data on a display device by transmitting the replacement data to a client 110, 120. A client 110, 120 may present the replacement data on a display device to thereby present the replacement data to a user.

Figure 8:
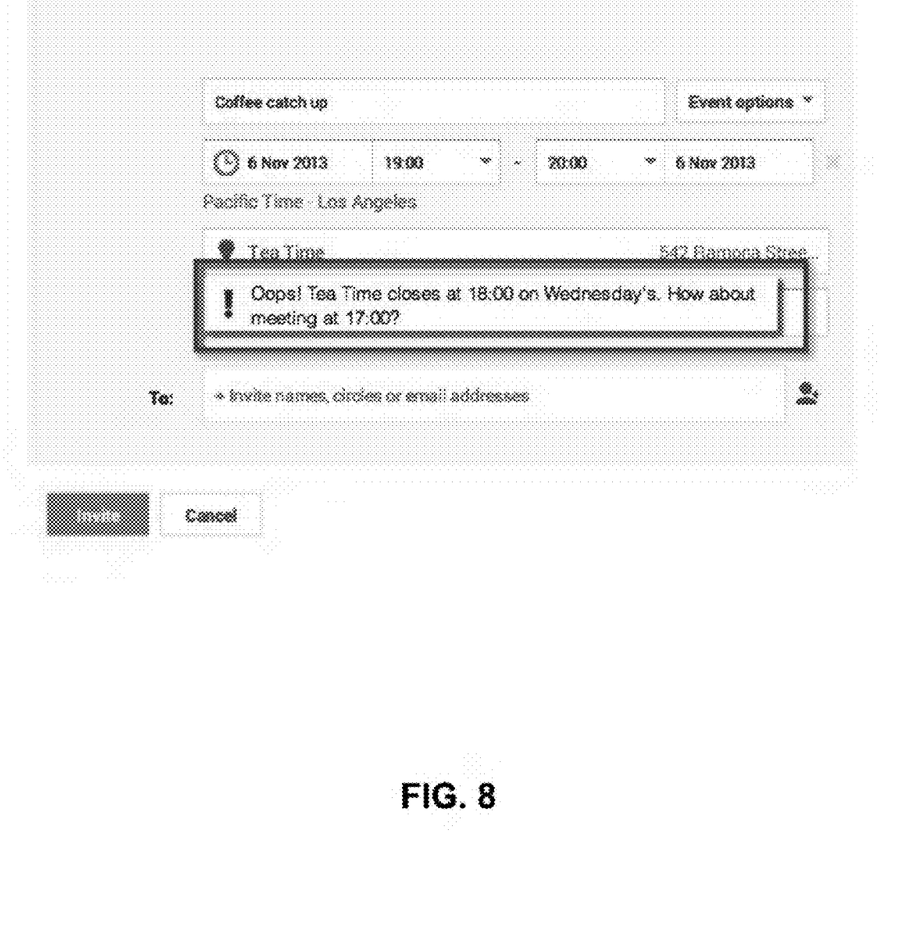
FIG. 8 illustrates an exemplary user interface for creating an event.

As illustrated in FIG. 8, for example, a display device may display a notification to the user that indicates what is causing a conflict with the set of parameters (e.g., "Oops! Tea Time closes at 18:00 on Wednesday's" may be display if the user attempted to create an event on a Wednesday at Tea Time between 19:00 and 20:00). Additionally, the replacement data may be displayed including an alternative time for the event (e.g., "How about meeting at 17:00?") and/or other replacement parameters. Other data may also be displayed. For example, the place or user from which source data was acquired that is associated with the replacement data may be displayed. For example, a website name associated with a website that was crawled to acquire source data associated with the replacement data may be displayed. Moreover, for example, a user name or other identifier associated with a user comment that was used to generate source data associated with the replacement data may be displayed.

Figure 9:
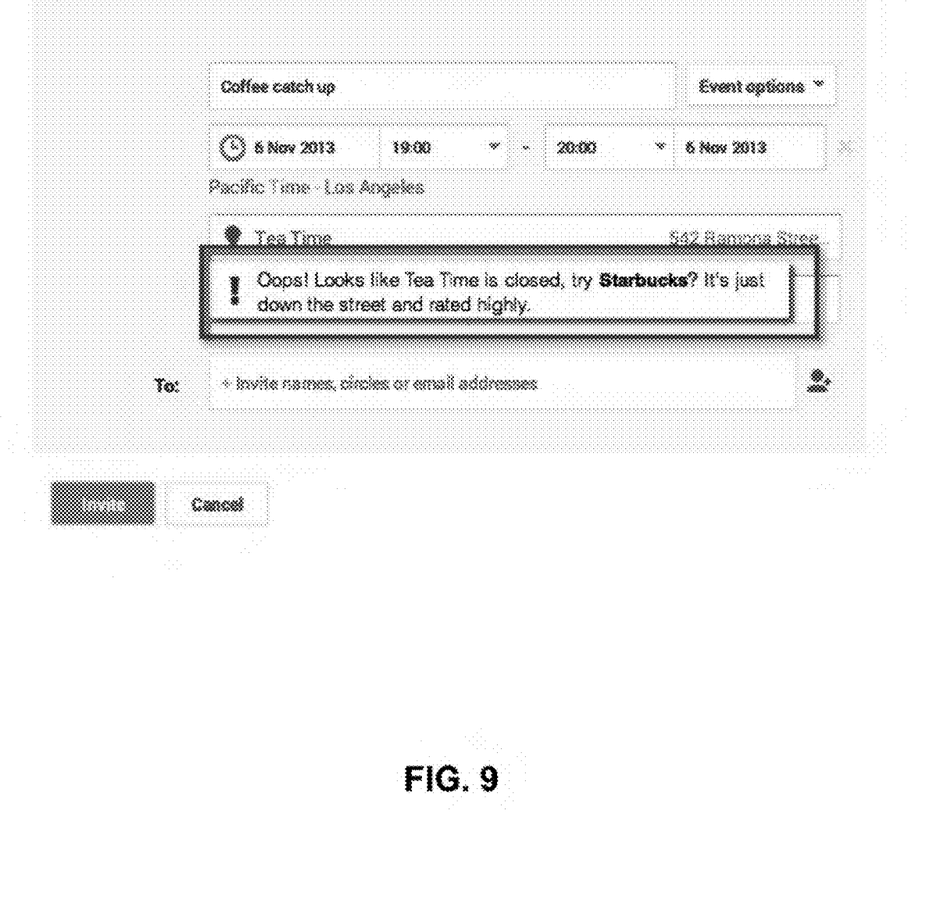
FIG. 9 illustrates an exemplary user interface for creating an event.

As a further example, as depicted in FIG. 9, a display device may display a notification to the user that indicates what is causing a conflict with the set of parameters (e.g., "Oops! Looks like Tea Time is closed"), replacement data including an alternative location for the event (e.g., "try Starbucks?"), and/or information about the alternative location (e.g., "It's just down the street and rated highly").

In some embodiments, the display device may prompt a user to accept or reject the displayed replacement data. Alternatively, in some embodiments, the display device may prompt the user to enter new data (e.g., a new time or new location) after displaying the replacement data. A user's selection regarding the replacement data may be transmitted from a client 110, 120 to server 140 via network 130. The user's selection may include, for example, a user's acceptance or rejection of the displayed replacement data and/or a user's entering of new data.

Referring again to FIG. 3, method 300 may then update, based on a selection received from the user, the set of parameters for the event to include the replacement data (step 350). For example, server 140 may replace or augment one or more of the original set of parameters for the event with the replacement data. In some embodiments, the selection received from the user may also be used to adjust a subsequent determination of subsequent replacement data for a subsequent user-created event. For example, a user's acceptance of replacement data may increase the likelihood of the same replacement data being suggested for a subsequent user-created event. Conversely, a user's rejection of replacement data may decrease the likelihood of the same replacement data being suggested for a subsequent user-created event.

In some embodiments, a set of feedback data may be received from the user who created the event or from other users. The feedback data may be associated with an improper determination of the replacement data. For example, the feedback data may include an indication that the replacement data included an unsatisfactory suggestion (e.g., the replacement data included an alternative time for a business location at a time when the business location was closed) or was unnecessary (e.g., the original time and business location for the event would have been acceptable). Based on the feedback data, an adjustment may be made for one or more subsequent determinations of subsequent replacement data for subsequent user-created events.

Figure 4:
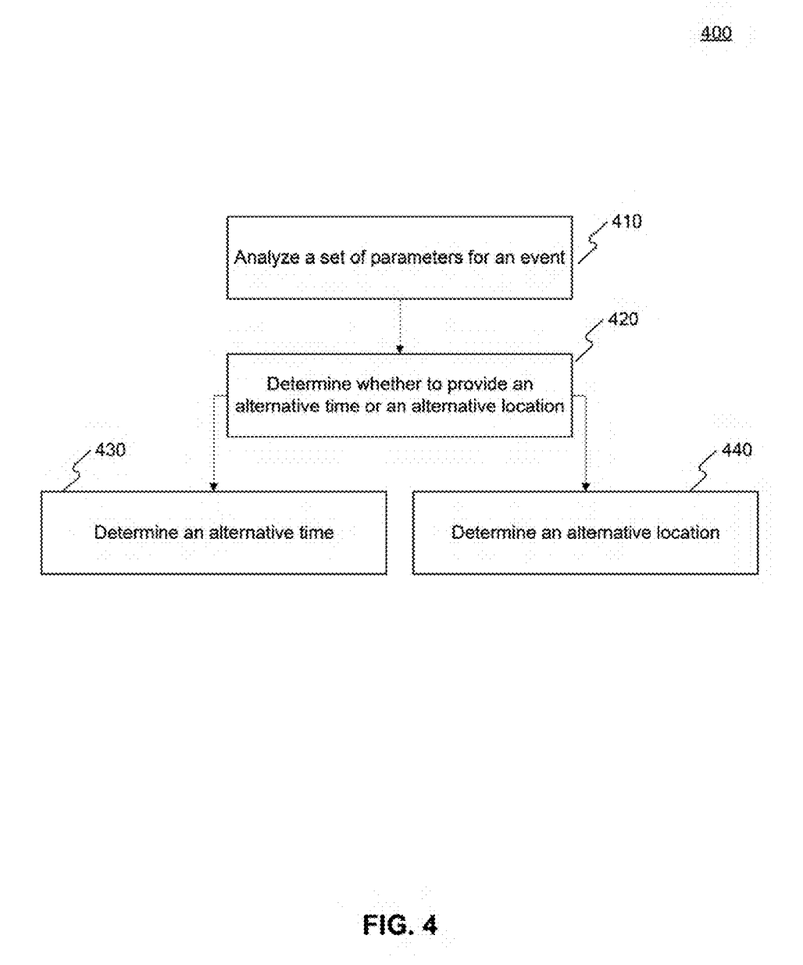
FIG. 4 illustrates an exemplary method for verifying parameters for a user-created event.

FIG. 4 depicts a flowchart of an exemplary method 400 for verifying parameters for a user-created event. In some embodiments, method 400 may be implemented as one or more computer programs executed by a processor. Moreover, in some embodiments, method 400 may be implemented by a server (e.g., server 140 having one or more processors executing one or more computer programs stored on a non-transitory computer readable medium), a client (e.g., client 110, 120 having one or more processors executing one or more computer programs stored on a non-transitory computer readable medium), or by both a client and a server. Method 400 is indicative of some techniques for performing step 330 (e.g., determining replacement data for one or more of the set of parameters for the event) of method 300. Prior to commencement of method 400, a determination for a need for replacement data may have already been made.

In some embodiments, exemplary method 400 begins by analyzing a set of parameters for an event (step 410). For example, significant keywords may be extracted from an event title or description. The set of parameters (including, for example, the extracted keywords) may be compared to, for example, data relating to previous user-created events to determine user preferences for similar events. Other analysis may also be performed. For example, the time until an event is scheduled to begin may be determined. Additionally, for example, the amount of similar types of locations within a certain distance to an original location in the set of parameters may be determined. Similar locations may be determined based on source data that describes locations. For example, as discussed above with reference to the example in FIG. 9, "Starbucks" may be determined as a similar location to "Tea Time" if source data describes both as being cafés. Various other classifications of locations in the source data may also be used to determine locations similar to an original location in the set of parameters characterizing an event.

Method 400 may then determine whether to provide an alternative time or an alternative location based on the analysis (step 420). For example, if the set of parameters is similar to parameters for events in which data is present that is indicative of a user preference for change of event time, then a determination may be made to provide an alternative time. Alternatively, if the set of parameters is similar to parameters for events in which data is present that is indicative of a user preference for change of event location, then a determination may be made to provide an alternative location. Other factors may also be taken into account in the determination, such as the amount of similar types of locations (e.g., at least one) within a certain distance from an original location in the set of parameters or a user location, or the time until an event is scheduled to begin. For example, if few or no similar locations are near the original location, an alternative time may be preferred; if the event is scheduled to begin soon, an alternative location may be preferred. In some embodiments, various determinations may be assigned weights to determine an overall preference for determining an alternative time or an alternative location. While in some embodiments a determination may be made to only provide an alternative time or to only provide an alternative location, in other embodiments, a determination may be made to provide both an alternative time and an alternative location.

Method 400 may determine an alternative time (step 430). For example, server 140 may analyze the source data to determine a time of day and/or date when a business at a location is open. The alternative time may relate to the original time in the set of parameters. For example, the alternative time may be as close as possible to the original time without being in conflict with the source data. Similarly, for example, the alternative time may be the same time of day as the original time in the set of parameters, but one a different date.

Method 400 may also, or alternatively, determine an alternative location (step 440). For example, a location associated with a similar business may be determined as the alternative location if it is within a predetermined distance of the original location in the set of parameters. If more than one similar location is within the predetermined distance, a particular one of the locations may be selected as the alternative location based on which is the most similar location as characterized by the source data, a user preference, reviews/rankings of the locations, and/or any other data that distinguishes between the potential alternative locations.

Figure 5:
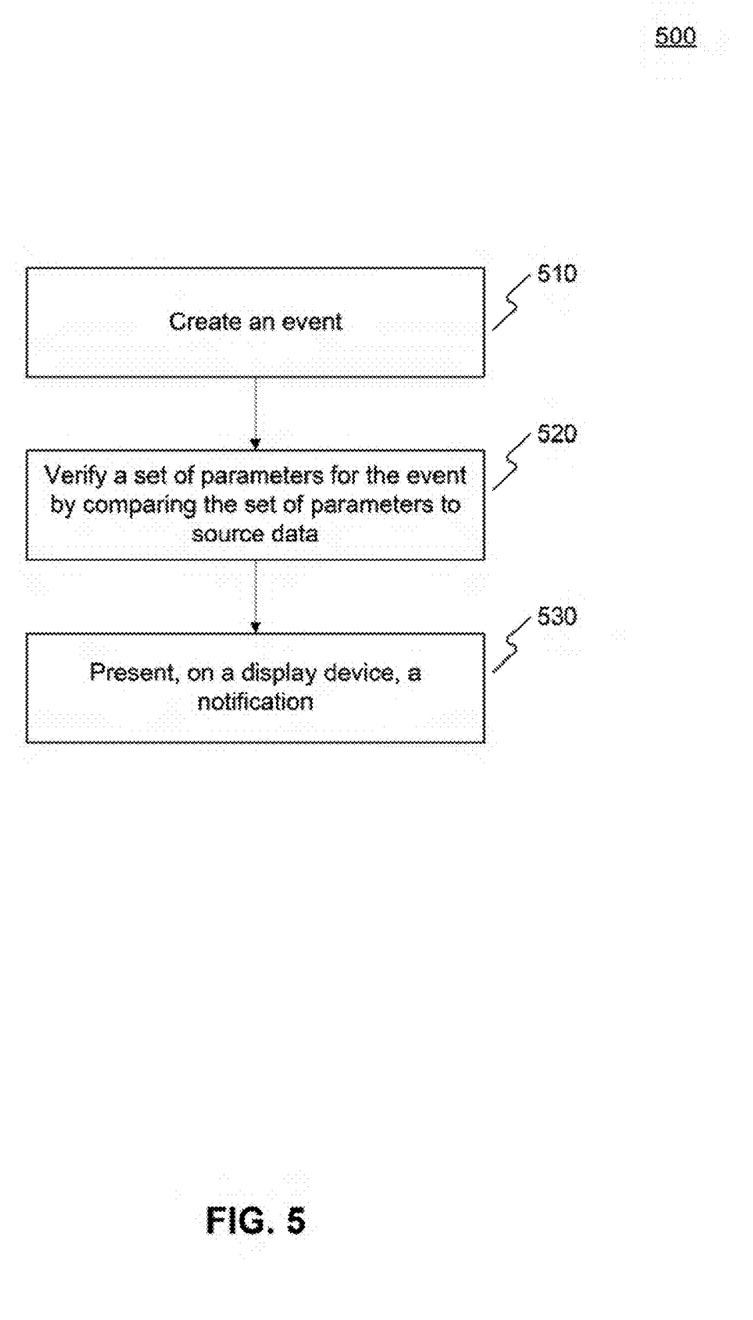
FIG. 5 illustrates an exemplary method for event creation and verification.

FIG. 5 depicts an exemplary method 500 for event creation and verification. In some embodiments method 500 may be implemented as one or more computer programs executed by a processor. Moreover, in some embodiments, method 500 may be implemented by a server (e.g., server 140 having one or more processors executing one or more computer programs stored on a non-transitory computer readable medium), a client (e.g., client 110, 120 having one or more processors executing one or more computer programs stored on a non-transitory computer readable medium), or by both a client and a server.

In some embodiments, exemplary method 500 begins by creating an event (step 510). An event may be created, for example, as described above with respect to method 300. Creation of an event may include, for example, storage of the set of parameters characterizing the event in client 110, 120, server 140, and/or database 150.

Method 500 may then verify a set of parameters for the event by comparing the set of parameters to source data (step 520). As discussed above, in some embodiments, verification of the set of parameters for the event may be performed after the event is created. For example, a website associated with a business location in the set of parameters characterizing the event may periodically be crawled. Verification may be performed, for example, in response to new data detected on the website after creation of the event. Alternatively, or additionally, verification of the created event may be performed regardless of whether new data is detected on the website. Verification of the set of parameters of a created event may be performed in substantially the same manner as the analysis of the set of parameters for an event being created described above with respect to methods 300 and 400.

Method 500 may then present, on a display device, a notification (step 530). The notification may include, for example, replacement data, as described above with reference to the exemplary embodiments of FIGS. 3 and 4. In some embodiments, the notification is sent to the user that created the event and all invitees to the event. In other embodiments, the notification may be sent to only the user that created the event; if the user chooses to modify the event, an additional notification may be sent to the other users invited to the event.

While the present disclosure provides examples of one or more processes or apparatuses, it will be appreciated that other processes or apparatuses can be implemented or adopted to be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A computer-implemented system for verifying parameters for a user-created event, comprising:
   a memory device that stores a set of instructions;
   at least one processor that executes the instructions to:
      receive a set of parameters for an event created by a user, the set of parameters comprising a location for the event;
      obtain source data that includes one or more parameters, wherein the source data is generated independent of the user and is obtained from at least one of a group comprising crawled-Internet data, social network or media data, and comments from other users;
      verify the set of parameters for the event by comparing the set of parameters to the source data;
      determine that a conflict is identified as a result of the verification;
      determine, based on the determination that a conflict is identified and the source data, replacement data for one or more of the set of parameters for the event, the replacement data comprising at least one alternative location based at least in part on a similarity of the alternative location with the location for the event, wherein the similarity is determined based at least in part on a user preference, a review or ranking of the replacement location, or a distinguishing characteristic of the alternative location with respect to the one or more potential alternative locations;
      present, on a display device, the replacement data for a selection by the user; and
      update, based on the selection received from the user, the set of parameters for the event to include the replacement data.

2. The computer-implemented system according to claim 1, wherein the source data is generated dynamically in response to an occurrence that affects one or more of the set of parameters.

3. The computer-implemented system according to claim 1, wherein the set of parameters for the event include a time for the event.

4. The computer-implemented system according to claim 1, wherein the replacement data includes at least one from a group comprising an alternative time and an alternative location for the event.

5. The computer-implemented system according to claim 1, wherein the determination of the replacement data is performed when a conflict is identified as a result of the verification of the set of parameters for the event.

6. The computer-implemented system according to claim 5, wherein the determination of the replacement data includes a determination of an alternative time for the event.

7. The computer-implemented system according to claim 5, wherein the determination of the replacement data includes a determination of the alternative location for the event.

8. The computer-implemented system according to claim 5, wherein the determination of the replacement data includes a determination of whether to provide an alternative time for the event.

9. The computer-implemented system according to claim 1, wherein the at least one processor further executes the instructions to:
   receive a set of feedback data indicative of the user's satisfaction with the determined replacement data for one or more of the set of parameters for the event, from the user or from other users, associated with an improper determination of the replacement data; and
   adjust, based on the set of feedback data, a subsequent determination of subsequent replacement data for a subsequent user-created event.

10. The computer-implemented system according to claim 1, wherein the at least one processor further executes the instructions to:
   prior to verifying the set of parameters for the event, perform an initial verification of the set of parameters for the event and create the event.

11. The computer-implemented system according to claim 1, wherein the at least one processor further executes the instructions to:
   adjust, based on the selection received from the user selecting the replacement data, a subsequent determination of subsequent replacement data for a subsequent user-created event.

12. A method for verifying parameters for a user-created event, comprising:
   receiving a set of parameters for an event created by a user, the set of parameters comprising a location for the event;
   obtaining source data that includes one or more parameters, wherein the source data is generated independent of the user and is obtained from at least one of a group comprising crawled-Internet data, social network or media data, and comments from other users;
   verifying the set of parameters for the event by comparing the set of parameters to the source data;
   determining that a conflict is identified as a result of the verification;
   determining, based on the determination that a conflict is identified and the source data, replacement data for one or more of the set of parameters for the event, the replacement data comprising at least one alternative location based at least in part on a similarity of the alternative location with the location for the event, wherein the similarity is determined based at least in part on a user preference, a review or ranking of the replacement location, or a distinguishing characteristic of the alternative location with respect to the one or more potential alternative locations;
   presenting, on a display device, the replacement data for a selection by the user;
   and
   updating, based on the selection received from the user, the set of parameters for the event to include the replacement data.

13. The method according to claim 12, wherein the source data is generated dynamically in response to an occurrence.

14. The method according to claim 12, wherein the set of parameters for the event include a time for the event.

15. The method according to claim 12, wherein the replacement data includes at least one from a group comprising an alternative time and an alternative location for the event.

16. The method according to claim 12, wherein the determination of the replacement data is performed when a conflict is identified as a result of the verification of the set of parameters for the event.

17. The method according to claim 16, wherein the determination of the replacement data includes a determination of an alternative time for the event.

18. The method according to claim 16, wherein the determination of the replacement data includes a determination of the alternative location for the event.

19. The method according to claim 16, wherein the determination of the replacement data includes a determination of whether to provide an alternative time for the event.

20. The method according to claim 12, further comprising:
   receiving a set of feedback, from the user or from other users, associated with an improper determination of the replacement data; and
   adjusting, based on the set of feedback data, a subsequent determination of subsequent replacement data for a subsequent user-created event.

21. The method according to claim 12, further comprising:
   prior to verifying the set of parameters for the event, perform an initial verification of the set of parameters for the event and create the event.

22. The method according to claim 12, further comprising:
   adjusting, based on the selection received from the user, a subsequent determination of subsequent replacement data for a subsequent user-created event.

23. A non-transitory computer-readable medium storing instructions that, when executed by at least one processor, cause the at least one processor to perform operations comprising:
   receiving a set of parameters for an event created by a user, the set of parameters comprising a location for the event;
   obtaining source data that includes one or more parameters, wherein the source data is generated independent of the user and is obtained from at least one of a group comprising crawled-Internet data, social network or media data, and comments from other users;
   verifying the set of parameters for the event by comparing the set of parameters to the source data;
   determining that a conflict is identified as a result of the verification;
   determining, based on the determination that a conflict is identified and the source data, replacement data for one or more of the set of parameters for the event, the replacement data comprising at least one alternative location based at least in part on a similarity of the alternative location with the location for the event, wherein the similarity is determined based at least in part on a user preference, a review or ranking of the replacement location, or a distinguishing characteristic of the alternative location with respect to the one or more potential alternative locations;
   presenting, on a display device, the replacement data for a selection by the user;
   and
   updating, based on the selection received from the user, the set of parameters for the event to include the replacement data.

24. The non-transitory computer-readable medium according to claim 23, wherein the source data is generated dynamically in response to an occurrence.

25. The non-transitory computer-readable medium according to claim 23, wherein the set of parameters for the event include a time for the event.

26. The non-transitory computer-readable medium according to claim 23, wherein the replacement data includes at least one from a group comprising an alternative time and an alternative location for the event.

27. The non-transitory computer-readable medium according to claim 23, wherein the determination of the replacement data is performed when a conflict is identified as a result of the verification of the set of parameters for the event.

28. The non-transitory computer-readable medium according to claim 27, wherein the determination of the replacement data includes a determination of an alternative time for the event.

29. The non-transitory computer-readable medium according to claim 27, wherein the determination of the replacement data includes a determination of the alternative location for the event.

30. The non-transitory computer-readable medium according to claim 27, wherein the determination of the replacement data includes a determination of whether to provide an alternative time for the event.

31. The non-transitory computer-readable medium according to claim 23, wherein the instructions, when executed by the at least one processor, further cause the at least one processor to perform operations comprising:
  receiving a set of feedback data, from the user or from other users, associated with an improper determination of the replacement data; and
  adjusting, based on the set of feedback data, a subsequent determination of subsequent replacement data for a subsequent user-created event.

32. The non-transitory computer-readable medium according to claim 23, wherein the instructions, when executed by the at least one processor, further cause the at least one processor to perform operations comprising:
  prior to verifying the set of parameters for the event, perform an initial verification of the set of parameters for the event and create the event.

33. The non-transitory computer-readable medium according to claim 23, wherein the instructions, when executed by the at least one processor, further cause the at least one processor to perform operations comprising:
  adjusting, based on the selection received from the user, a subsequent determination of subsequent replacement data for a subsequent user-created event.

\* \* \* \* \*